United States Patent

Magg et al().

[11] 4,059,178
[45] Nov. 22, 1977

[54] GEAR-SHIFTING JAW CLUTCH FOR SPEED-CHANGING VEHICULAR TRANSMISSION

[75] Inventors: Alfred Magg, Tettnang; Günther Thurau, Friedrichshafen, both of Germany

[73] Assignee: Zahnradfabrik Friedrichshafen Aktiengesellschaft, Friedrichshafen, Germany

[21] Appl. No.: 705,814

[22] Filed: July 16, 1976

[51] Int. Cl.² ............................................. F16D 23/06
[52] U.S. Cl. .................................................. 192/53 F
[58] Field of Search ...................................... 192/53 F

[56] References Cited

U.S. PATENT DOCUMENTS 3,552,531   1/1971   Grosseau .......................... 192/53 F Primary Examiner—Allan D. Herrmann
Attorney, Agent, or Firm—Karl F. Ross

[57] ABSTRACT

Two gears idling on a shaft can be selectively coupled therewith by an interposed jaw clutch including a central gear fixed to the shaft and a surrounding ring gear axially slidable thereon for engagement with jaw teeth on either of the two flanking idler gears. Two blocking rings on opposite sides of the central gear are entrained thereby for joint rotation with freedom of limited relative angular displacement by frictional contact with the adjoining idler gears between two extreme relative position in which these rings prevent the shifting of the ring gear into engagement with the jaw teeth of the corresponding idler gear; such engagement is possible only in an intermediate angular position of the respective blocking ring in which several stop teeth on the blocking ring register with matching peripheral indentations on the ring gear. The ring gear has several angularly equispaced inner peripheral recesses accommodating radially slidable keys of which at least one coacts on standstill and at low shaft speeds with respective pairs of bosses on either blocking ring to move the latter into its nonblocking position upon an axial sliding of the ring gear toward it, these keys being centrifugally displaced outwardly at higher shaft speeds so as to be ineffectual.

10 Claims, 10 Drawing Figures

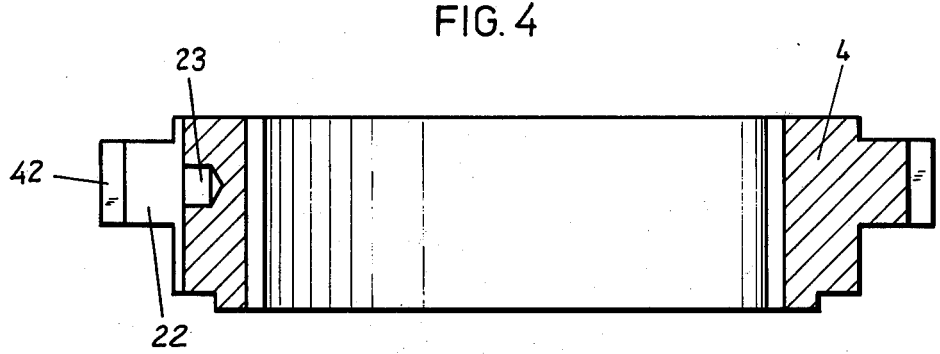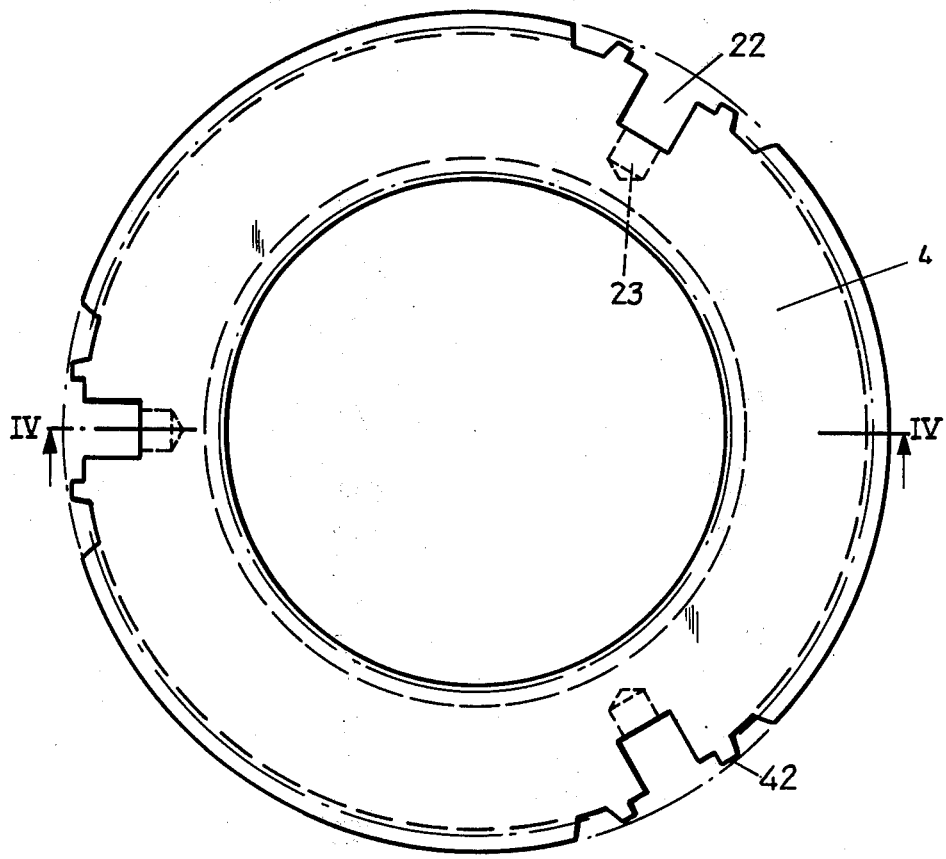

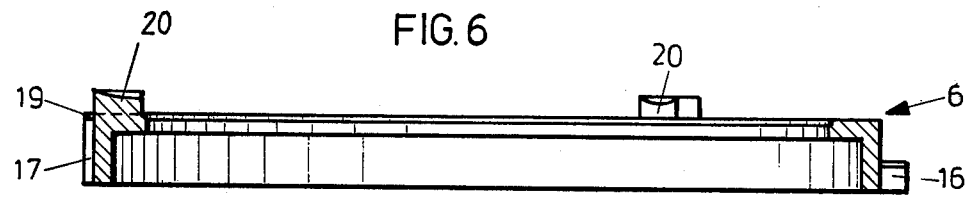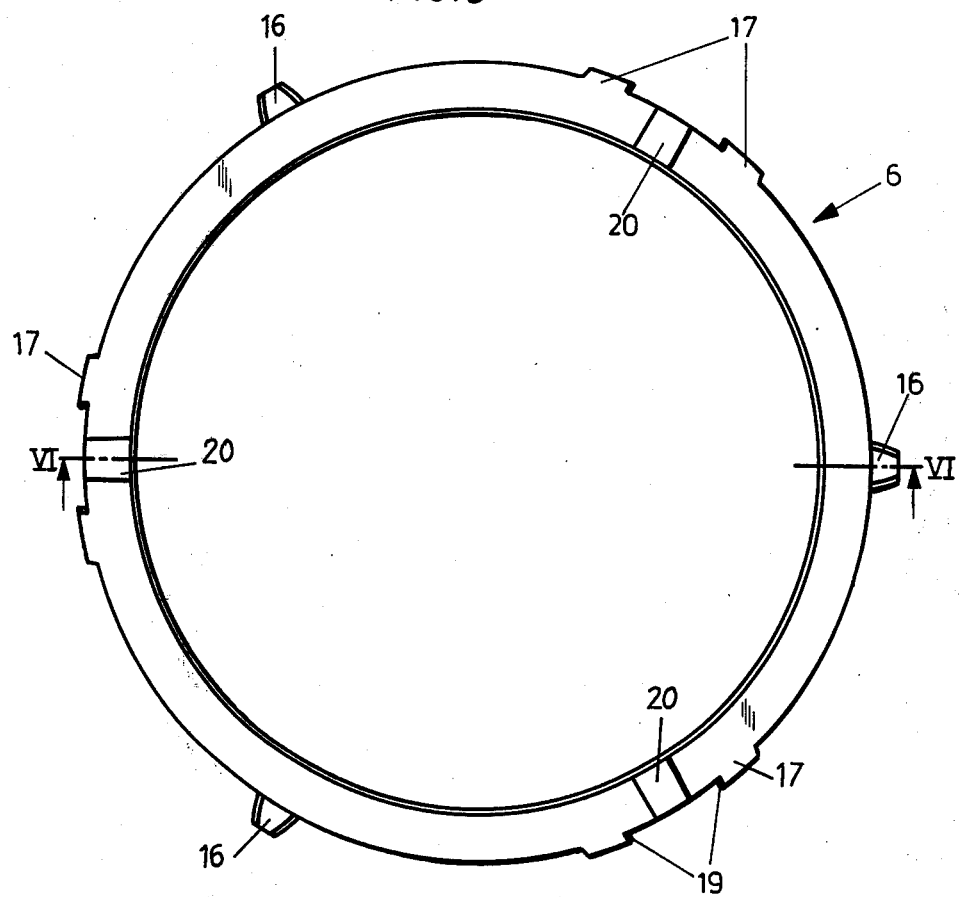

U.S. Patent  Nov. 22, 1977  Sheet 5 of 5  4,059,178
FIG. 7
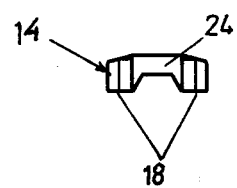
FIG. 8
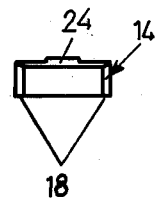
FIG. 9
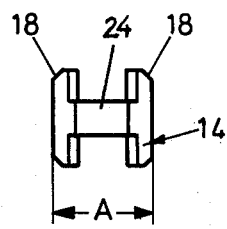
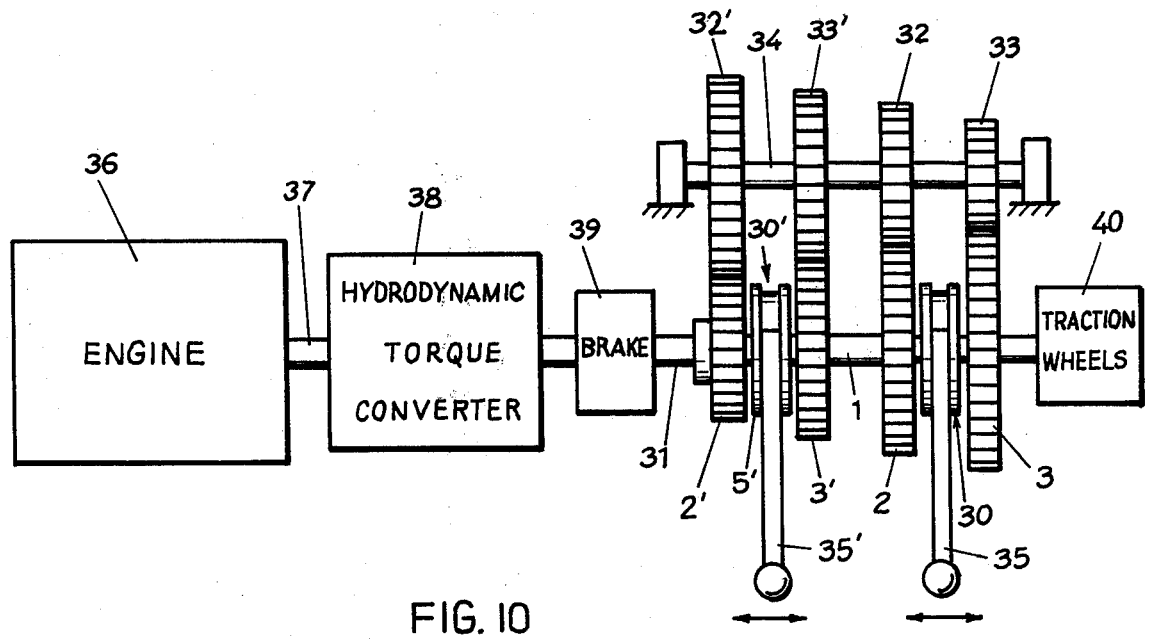
FIG. 10

GEAR-SHIFTING JAW CLUTCH FOR SPEED-CHANGING VEHICULAR TRANSMISSION

FIELD OF THE INVENTION

Our present invention relates to a jaw clutch as used for gear-shifting purposes in a speed-changing transmission of an automotive vehicle.

BACKGROUND OF THE INVENTION

In commonly owned German published specification P 24 39 228.7-12 a jaw clutch has been described which comprises a central body secured to a shaft between two idler gears which are provided with respective sets of jaw teeth selectively engageable by a toothed ring that is axially slidably on the central body but nonrotatable with reference thereto. In order to prevent such interengagement when the shaft and the gear to be coupled therewith turn at different speeds, the central body is flanked by a pair of blocking rings which are limitedly rotatable with reference to that body between two extreme relative angular positions into which either blocking ring is frictionally entrained by the adjoining idler gear when the speed of the latter is either greater or less than that of the central body. A coupling engagement can therefore take place only upon temporary synchronization of the two rotations, i.e. at the instant when an acceleration or deceleration of either the shaft or the gear moves the corresponding blocking ring from its previous limiting position toward the opposite end of its range past an intermediate position in which that ring is ineffectual to prevent an axial shift of the ring gear to the side of the synchronously rotating idler gear. The temporary synchronization necessary for the clutching operation is generally brought about by a change in engine speed through a controlled depression or release of the vehicular accelerator pedal. Such clutches are particularly useful for heavy-duty utility vehicles with four or more speeds established by manual gear shifting.

When the engine is started up from standstill, the jaw clutch is usually disengaged. With the vehicle either at standstill or rolling very slowly, e.g. on a slope, the clutch body and the idler gear — either of which may be driven from the engine — have a relative speed such that the blocking ring is entrained into one of its limiting positions. In order to facilitate coupling, this relative speed would have to be reversed as described above; since, however, the engine can rotate only unidirectionally, such a speed reversal is not possible under these circumstances. To remedy this deficiency, it has already been proposed to provide each blocking ring with a restoring spring designed to hold that ring in its intermediate, nonblocking position when the jaw clutch is disengaged, i.e. when its slidable ring gear is in its axial midposition. A drawback of this solution is that the entrainment of the blocking ring into either of its operating positions requires the frictional transmission of higher torques, with increased danger of slippage and resulting untimely contact between the relatively rotating sets of jaw teeth. A restoring spring, furthermore, is inherently unable to move such a blocking ring into a precisely centered position within its range of relative rotation.

OBJECT OF THE INVENTION

The object of our present invention, accordingly, is to provide an improved jaw clutch of the character described which enables the selective coupling of a shaft with a member idling thereon, such as a gear, a sprocket or a pulley, during synchronous rotation even at zero or near-zero speeds.

SUMMARY OF THE INVENTION

We realize this object, in conformity with our present invention, by the provision of radially movable weight means on an axially shiftable annular tooth carrier (preferably a ring gear, as in the above-identified German specification) surrounding the central clutch body. Cooperation between the radially movable weight means and coacting formations on the associated blocking ring or rings, at shaft speeds less than a predetermined limit, rotates the blocking ring into its ineffectual intermediate position; at higher shaft speeds, the weight means will be centrifugally moved out of alignment with the coacting formations on the blocking ring whereby the latter will be free to turn (in the disengaged state of the clutch) into either of its limiting angular positions into which it is frictionally entrained by the nonsynchronously rotating idling member adjoining it.

BRIEF DESCRIPTION OF THE DRAWING

The above and other features of our invention will now be described in detail with reference to the accompanying drawing in which:

FIG. 3 is a side view of a central body forming part of the clutch assembly;

FIG. 4 is a cross-sectional view of the central body, taken on the line IV — IV of FIG. 3;

FIG. 5 is a side view of a blocking ring forming part of the clutch assembly;

FIG. 6 is a cross-sectional view of the blocking ring, taken on the line VI — VI of FIG. 5;

FIG. 7 is a side view of a weighted key forming part of the clutch assembly;

FIG. 8 is a front view of the key shown in FIG. 7;

FIG. 9 is a top view of the same key; and

FIG. 10 is an overall diagrammatic view of an automotive transmission incorporating our improved jaw clutch.

SPECIFIC DESCRIPTION

Figure 1:
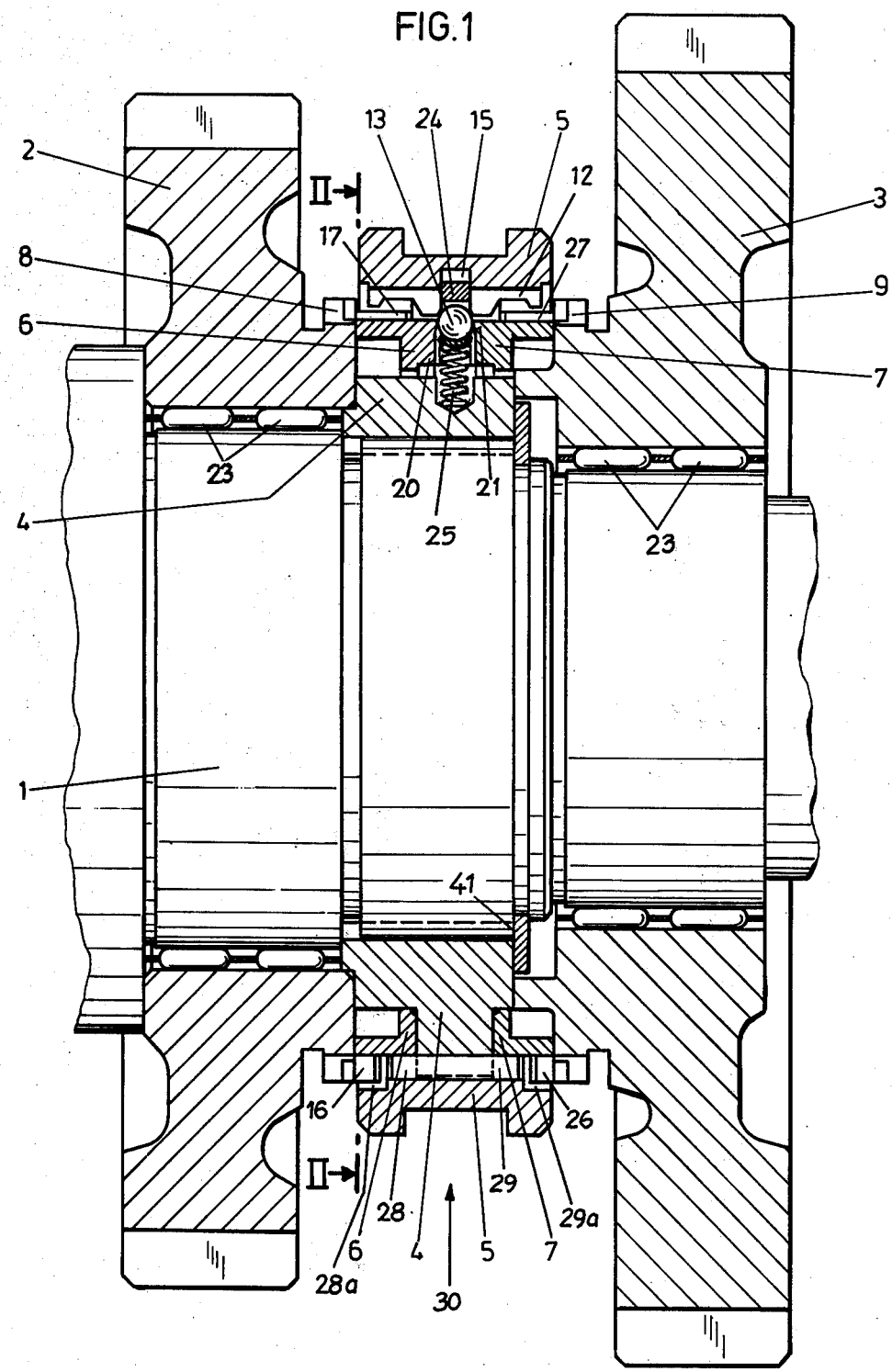
FIG. 1 is an axial sectional view of a jaw clutch flanked by a pair of idler gears on a shaft.

Reference will first be made to FIG. 10 showing an automotive speed-changing transmission generally similar to one illustrated in the aforementioned German printed specification No. 24 39 228.7-12. An internal-combustion engine 36 has an output shaft 37 working into a hydrodynamic torque converter 38 which drives a shaft 31 immobilizable by a brake 39. Coaxial with drive shaft 31 is a load shaft 1 coupled with the traction wheels 40 of an otherwise nonillustrated vehicle powered by the engine 36. It will be understood that the connection between shaft 1 and traction wheels 40 may include other transmission elements such as, for example, a differential gear.

Figure 2:
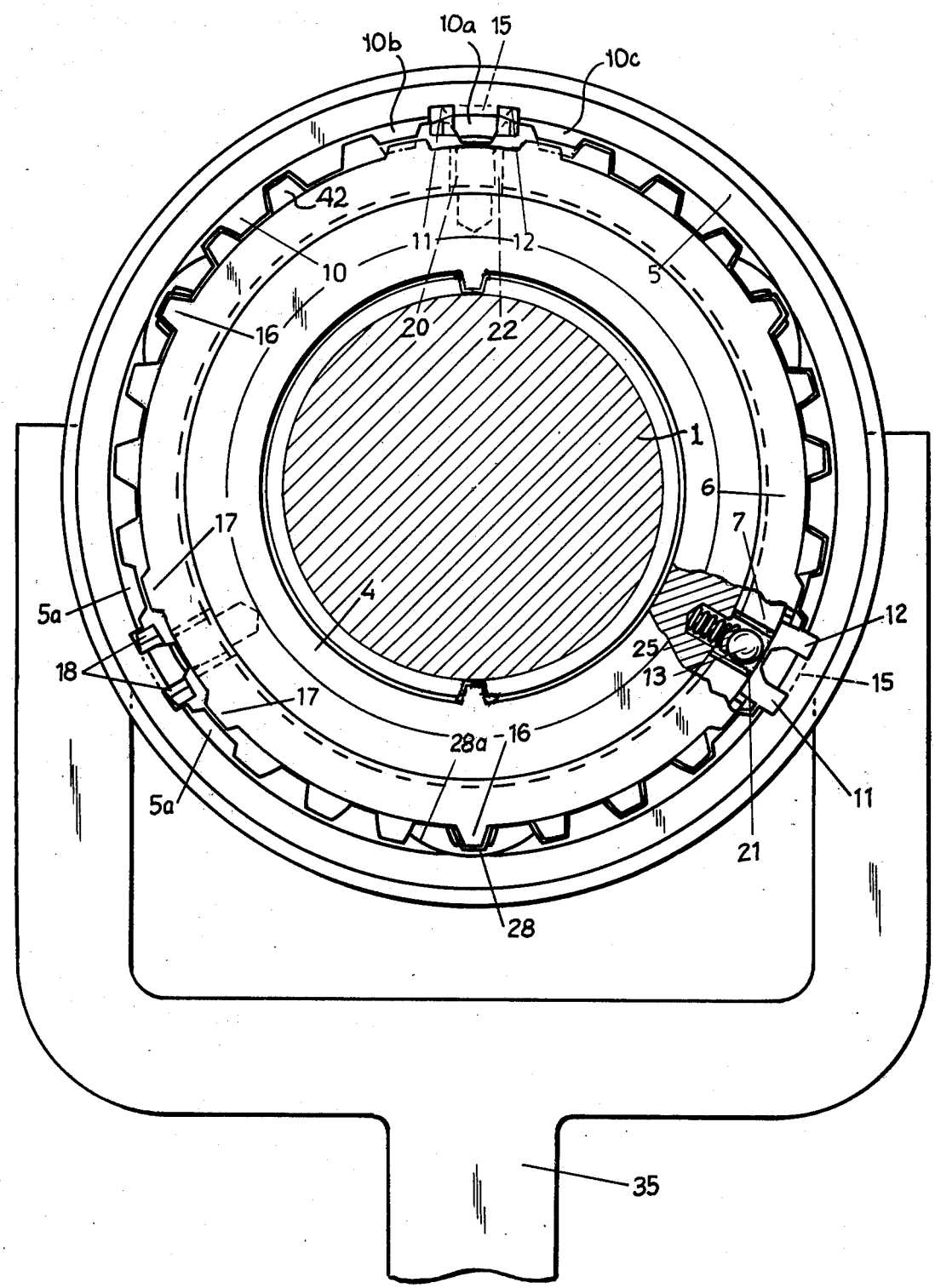
FIG. 2 is a cross-sectional view of the clutch assembly taken substantially on the line II — II of FIG. 1, with parts broken away.

A gear 2', keyed to drive shaft 31, meshes with a gear 32' on an ancillary shaft 34. Gear 2' is coaxial with three other gears 3', 2 and 3, of progressively larger diameters, which are idle on load shaft 1 and mesh with respective gears 33', 32 and 33 keyed to shaft 34. Two jaw clutches 30 and 30', rigid with shaft 1, are interposed between respective gear pairs 2, 3 and 2', 3' for selectively coupling either gear of the corresponding pair with shaft 1. With engine 36 operating, brake 39 released and clutches 30, 30' in neutral, all the gears rotate but shaft 1 is not driven. Clutches 30 and 30' are axially shiftable from their illustrated neutral position, by respective forks 35 and 35', only when the angular shaft speed substantially matches that of the gear to be coupled thereof. On standstill, therefore, brake 39 will have to be actuated in order to arrest the rotating gears whereupon clutch 30 may be operated to engage either of the gears 2 and 3 whose angular velocity is lower than those of gears 2' and 3' and which therefore transmit a higher starting torque upon the release of the brake. For this reason, clutch 30' may be of the conventional type described in the German specification whereas clutch 30 incorporates our present improvement as will now be more fully described with reference to FIGS. 1-9.

in FIGS. 1 and 2 we have shown details of the clutch 30 which comprises an annular central body 4 keyed to the shaft 1 and held in position thereon by a split ring 41. Body 4 has a set of external gear teeth 42 meshing with internal gear teeth 10 of a surrounding ring gear 5 which is coaxially slidable relatively to body 4 and shaft 1. The clutch body 4 is flanked by two coaxial and symmetrical blocking rings 6 and 7 which are limitedly rotatable on that body to an extent determined by three angularly equispaced stop teeth 16 (ring 6) or 26 (ring 7), received with play in arcuate undercuts 28a, 29a of toothed ring 5. Each stop tooth 16 or 26 registers, in a centered position of its blocking ring as illustrated for ring 6 in FIG. 2, with a respective indentation 28 or 29 formed in a land of ring 5 constituting the inner wall of its undercut. The teeth 16, 26 and their indentations 28, 29 have beveled flanks facilitating the entry of these teeth into the indentations upon a corresponding axial shift of ring gear 5 by fork 35. In this centered position of ring 6 or 7, therefore, the ring 5 can approach the respective idler gear 2 or 3 for mating engagement of its own teeth 10 with a set of jaw teeth 8 or 9 on that idler gear, these jaw teeth having beveled flanks facing the ring gear 5 to facilitate such engagement.

The two blocking rings 6 and 7 are provided with confronting, peripherally equispaced shoulders 20 and 21 (three for each ring) between which respective balls 13, urged radially outwardly by biasing springs 25, are received in radial cutouts 22 of clutch body 4. The shoulders 20 and 21 have convex camming faces converting the outward thrust of the spring-loaded balls 13 into a lateral force tending to separate the tow blocking rings with exertion of a light contact pressure upon the adjoining gears 2 and 3. That contact pressure suffices for the angular entrainment of the blocking rings by the relatively rotating idler gears but does not frictionally couple either gear with the clutch body 4 for joint rotation.

At three peripherally spaced points aligned with cutouts 22, ring gear 5 is formed with generally H-shaped inner peripheral recesses comprising each a central channel 15, forming the bar of the "H", and two open-ended transverse grooves 11 and 12 representing the legs of the "H". Channel 15, centered on the axis of shaft 1, traverses a tooth 10a of ring gear 5, this tooth being bracketed by the transverse grooves 11 and 12. Adjacent teeth 10b and 10c are of reduced height in order to give passage to pairs of peripherally spaced bosses 17 and 27 on rings 6 and 7, respectively, these bosses having beveled edges 19 and (FIGS. 4 and 5) facing the clutch body 4.

Each peripheral recess 11, 12, 15 accommodates a respective key 14 of complementary shape, best seen in FIGS. 7-9, having a central web 24 received in channel 15 and laterally projecting extremities with beveled faces 18 accommodated in grooves 11 and 12. Each key 14 is thus positively held against peripheral and axial displacement relative to ring gear 5 but is limitedly radially shiftable in the corresponding peripheral recess under the combined action of gravity and centrifugal force.

With clutch 30 decoupled from both idler gears 2 and 3, as illustrated in FIG. 1, each blocking ring 6, 7 will generally be in one of its two limiting positions defined by contact of its stop teeth 16 or 26 with the arcuate bottoms of their undercuts 28a or 29a. If, for example, the vehicle is rolling downhill and is to be decelerated by a coupling of shaft 1 with the slower-turning gear 2, the driver will try to shift the toothed ring 5 to the left but will not be able to engage the clutch until a depression of the gas pedal has accelerated the engine-driven gear 2 to momentary synchronism with clutch body 4. With shaft 1 assumed to be turning at a speed higher than the operational limit of keys 14, all three keys are centrifugally urged outwardly in their respective recesses 11, 12, 15 so as to have no influence upon the position of blocking ring 6.

Let us now consider the situation in which the vehicle is at standstill, shaft 1 being therefore at rest. At least one of the keys 14 at or near the top of the clutch body 4 is now in its position closest to the axis of rotation whereby the beveled faces 18 of its projecting extremities come to lie on the same radius as the confronting pairs of bosses 17 and 27 on rings 6 and 7. The angular gap between the bosses of each pair is slightly larger than the width A (FIG. 9) of the key 14 whereby the key can easily enter this gap upon a corresponding axial shifting of ring gear 5, the bevels 18 of the key and 19 of the blocking ring coacting to move that ring from its limiting position to its nonblocking centered position in which the teeth 16 or 26 register with the indentations 28 or 29. For a smooth starting of the vehicle it is, of course, necessary that the gear 2 or 3 to be coupled with shaft 1 should have zero or near-zero angular velocity. This can be readily accomplished by operating the brake 39 of FIG. 10 to establish the synchronism required for engagement of the clutch. If the idling speed of, say, gear 3 is very low, a shift into "first gear" from standstill can also be made in the released condition of brake 39 without objectionable jolting. The same is true if the vehicle is in slow motion so that the angular velocity of shaft 1 approaches that of gear 2 or 3. Under these circumstances, therefore, the clutch can be engaged without any reversal of the speed of gear 2 or 3 relative to that of shaft 1.

We claim:

1. In a transmission including a shaft, a rotary member freely rotatable about the axis of said shaft, said member being provided with a set of jaw teeth, a clutch on said shaft operable to couple said member with said shaft, said clutch having a central body secured to said shaft and an annular tooth carrier nonrotatable on said body but axially shiftable thereon for selective engagement with said jaw teeth, and actuating means for so shifting said tooth carrier, the improvement wherein said clutch is provided with a blocking ring coaxial with said tooth carrier and interposed between the latter and said member, said blocking ring being carried on said body with freedom of limited relative angular displacement by frictional contact with said member between two extreme positions in which said blocking ring prevents engagement of said tooth carrier with said jaw teeth, said blocking ring being frictionally entrainable by said member into a nonblocking intermediate angular position facilitating said engagement upon a passage of said member and said body through a condition of synchronous rotation; said tooth carrier being provided with radially movable weight means mounted for co-operation with coacting formations on said blocking ring, at shaft speeds less than a predetermined limit beyond which said weight means is centrifugally moved out of alignment with said coacting formations, to rotate said blocking ring into said intermediate position.

2. The improvement defined in claim 1 wherein said weight means comprises a plurality of mutually independent keys peripherally equispaced on said tooth carrier.

3. The improvement defined in claim 2 wherein said coacting formations are pairs of bosses separated by axially extending gaps on the periphery of said blocking ring, each of said gaps confronting a respective key and being bounded by camming edges of the associated pair of bosses diverging toward said body for receiving the respective key therebetween upon an axial shifting of said tooth carrier toward said member.

4. The improvement defined in claim 3 wherein said tooth carrier is a ring gear provided with internal jaw teeth mating with complementary teeth on said body, said ring gear being further provided with inner peripheral recesses traversing certain of said internal jaw teeth, said keys being respectively received in said recesses and being provided with angularly spaced axial projections flanking said certain of said internal jaw teeth, said projections lying on a common radius with said bosses at speeds less than said predetermined limit.

5. The improvement defined in claim 4 wherein other of said internal jaw teeth aligned with said bosses are reduced in height to give clearance of said bosses upon an axial shifting of said tooth carrier toward said member.

6. The improvement defined in claim 4 wherein said blocking ring is provided with a plurality of stop teeth received with angular play in peripheral undercuts of said tooth carrier offset from said recesses, said undercuts being bounded by lands having indentations accommodating said stop teeth in said intermediate position.

7. The improvement defined in claim 4 wherein said member and said blocking ring are symmetrically duplicated on opposite sides of said body, said recesses being generally H-shaped with the legs of the H formed by transverse grooves open toward the two symmetrical members and interconnected by a central channel, said projections lying in said grooves and extending on opposite sides of said channel.

8. The improvement defined in claim 7 wherein the two symmetrical blocking rings are provided with common biasing means in the regions of said recesses for urging said blocking rings axially outwardly toward said members.

9. The improvement defined in claim 1 wherein said member is part of a speed-changing gear train between a load coupled to said shaft and an engine coupled to said member, further comprising a hydrodynamic torque converter inserted between said engine and said member.

10. The improvement defined in claim 9, further comprising brake means downstream of said torque converter for arresting said member preparatorily to operation of said actuating means upon substantial standstill of said load.

* * * * *